(12) United States Patent
Moran (10) Patent No.: US 10,484,643 B2
(45) Date of Patent: Nov. 19, 2019

(54) INTELLIGENT CONTACT RECORDING IN A VIRTUAL REALITY CONTACT CENTER

(71) Applicant: AVAYA INC., Santa Clara, CA (US)

(72) Inventor: Thomas Moran, Galway (IE)

(73) Assignee: Avaya Inc., Santa Clara, CA (US)

( * ) Notice: Subject to any disclaimer, the term of this patent is extended or adjusted under 35 U.S.C. 154(b) by 90 days.

(21) Appl. No.: 15/348,054

(22) Filed: Nov. 10, 2016

(65) Prior Publication Data

US 2018/0130257 A1    May 10, 2018

(51) Int. Cl.
*G06T 19/00* (2011.01)
*H04N 5/77* (2006.01)
*G06F 16/29* (2019.01)
*G06F 16/9537* (2019.01)

(52) U.S. Cl.
CPC .............. *H04N 5/77* (2013.01); *G06F 16/29* (2019.01); *G06F 16/9537* (2019.01); *G06T 19/006* (2013.01)

(58) Field of Classification Search
None
See application file for complete search history.

(56) References Cited

U.S. PATENT DOCUMENTS

| | | | | |
|---|---|---|---|---|
| 7,583,275 B2* | 9/2009 | Neumann | ................ | G06T 17/00 345/419 |
| 8,331,611 B2* | 12/2012 | Johnson, II | ......... | G06F 17/3087 382/100 |
| 9,066,200 B1* | 6/2015 | Loxam | .................... | H04N 5/232 |
| 9,471,954 B2* | 10/2016 | Bostick | .................. | H04N 5/225 |
| 9,646,571 B1* | 5/2017 | Cote | ....................... | G09G 5/377 |
| 2004/0002049 A1* | 1/2004 | Beavers | ................... | G09B 5/00 434/350 |
| 2009/0002394 A1* | 1/2009 | Chen | ..................... | G06T 3/0062 345/632 |
| 2010/0131876 A1 | 5/2010 | McGuire et al. | | |
| 2010/0235218 A1 | 9/2010 | Erhart et al. | | |
| 2010/0296417 A1 | 11/2010 | Steiner | | |
| 2011/0066938 A1 | 3/2011 | Nageswaram et al. | | |
| 2011/0075819 A1 | 3/2011 | Bruce et al. | | |

(Continued)

OTHER PUBLICATIONS

Acrmnet, "The Architectural Past in 4D", Dec. 6, 2015, URL: https://web.archive.org/web/20151206104004/http://www.acrmnet.com/the-architectural-past-in-4d/.*

(Continued)

*Primary Examiner* — David H Chu
(74) *Attorney, Agent, or Firm* — Sheridan Ross P.C.

(57) ABSTRACT

As technology advances, customer-agent interactions require adoption of the new technologies to remain useful to customers and cost effective to contact centers. Virtual reality technology allows a customer to virtually tour a remote location and optionally interact with an agent during the virtual tour. The agent and/or customer may select virtual reality elements, including a recording of the interaction itself, to be triggered upon the customer, with a location enabled customer device, being located in the real-world at a corresponding virtual location in which the virtual reality element was created. The virtual reality element may be automatically presented and the presentation may be a full virtual reality presentation, an augmented reality presentation, or a converted presentation, such as to a more conventional format.

20 Claims, 4 Drawing Sheets

(56) References Cited

U.S. PATENT DOCUMENTS

| | | | |
|---|---|---|---|
| 2011/0125793 A1 | 5/2011 | Erhart et al. | |
| 2011/0125826 A1 | 5/2011 | Erhart et al. | |
| 2012/0113142 A1* | 5/2012 | Adhikari | G06Q 30/0623 |
| | | | 345/633 |
| 2013/0002649 A1* | 1/2013 | Wu | G06T 19/006 |
| | | | 345/419 |
| 2013/0051548 A1 | 2/2013 | Chavez | |
| 2013/0278631 A1* | 10/2013 | Border | G02B 27/017 |
| | | | 345/633 |
| 2014/0240350 A1* | 8/2014 | Chen | G01C 21/206 |
| | | | 345/633 |
| 2014/0247280 A1* | 9/2014 | Nicholas | G06F 3/011 |
| | | | 345/633 |
| 2014/0253743 A1* | 9/2014 | Loxam | H04N 5/232 |
| | | | 348/207.1 |
| 2014/0333664 A1* | 11/2014 | Williams | G06Q 30/0643 |
| | | | 345/633 |
| 2015/0279106 A1* | 10/2015 | Blanchflower | G06T 15/20 |
| | | | 345/2.2 |
| 2016/0188585 A1* | 6/2016 | Durham | G06F 3/011 |
| | | | 345/633 |
| 2017/0021273 A1* | 1/2017 | Rios | A63F 13/332 |
| 2017/0351323 A1* | 12/2017 | Colaianni | G06T 7/74 |
| 2017/0372674 A1* | 12/2017 | Xie | H04W 88/02 |

OTHER PUBLICATIONS

"Augmented and Virtual Reality Devices to Become a $4 Billion-Plus Business in Three Years," CCS Insight, Apr. 10, 2016, retrieved from <http://web.archive.org/web/20160410092556/http://www.ccsinsight.com/press/company-news/2251-augmented-and-virtual-reality-devices-to-become-a-4-billion-plus-business-in-three-years>, 2 pages.

"Augmented/Virtual Reality to hit $150 billion disrupting mobile by 2020," Digi-Capital, Apr. 2015, retrieved from <http://www.digi-capital.com/news/2015/04/augmentedvirtual-reality-to-hit-150-billion-disrupting-mobile-by-2020/#.WLyN3UkiyUl>, 6 pages.

"Virtual Reality in Gaming Market Worth $9.55 Billion by 2022," Grand View Research, Mar. 2016, retrieved from <http://www.grandviewresearch.com/press-release/global-virtual-reality-in-gaming-market>, 5 pages.

"Virtual Reality (VR) market to break through 1 billion barrier," Consultancy.uk, Apr. 8, 2016, retrieved from <http://www.consultancy.uk/news/3497/virtual-reality-vr-market-to-break-through-1-billion-barrier>, 5 pages.

Roberts, "Your next hotel could offer a virtual reality experience," Fortune, Sep. 9, 2015, retrieved from <http://fortune.com/2015/09/09/marriott-virtual-reality/>, 3 pages.

* cited by examiner

INTELLIGENT CONTACT RECORDING IN A VIRTUAL REALITY CONTACT CENTER

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for data gathering, recording, and playback and more specifically to systems for automatic selection of recording elements.

BACKGROUND

Customer interaction with a contact center is often defined by the technology known and available. Prior art contact centers facilitate interaction utilizing voice and multimedia (i.e. chat, email, text, etc.). As technology advances, such as with the advent of virtual reality (VR) technology, customers will become more familiar and may even prefer interactions utilizing the latest technology, such as VR.

One example that mixes VR technology with features of a contact center is the "teleport" scenario, whereby a customer can virtually visit a wide range of distant locations using VR technology. VR technology presently allows for companies, such as those within the travel and hospitality industry, that permit customers to remotely experience a distant exotic location using a VR headset within a booth that augments the experience with additional features like wind, heat, mist, etc., that are created locally in a "teleport" booth.

SUMMARY

These and other needs are addressed by the various embodiments and configurations of the present invention. The present invention can provide a number of advantages depending on the particular configuration. These and other advantages will be apparent from the disclosure of the embodiments contained herein.

In one embodiment, customers are provided with easy access to some of the key data associated with their VR contact center experience. Including, the later playback or access of the key data on non-VR applications (hardware and/or software). This may include providing the key data as a component in an augmented reality experience, such as to receive the key data for presentation by a VR, reduced feature set VR, and/or non-VR device.

In one example, a customer interaction with a VR contact center comprises virtually traversing a distant location and interacting with many aspects of that virtual location. For example, a user may visit a tourist destination that consists of a variety of resources such as restaurants, shops, places of historic interest and the like. As the customer virtually visits these various resources, they may interact in some level of detail with some specific resources. For example, when close to a restaurant, the customer may query the restaurant opening hours, menu details, special offers, etc. In another example, the customer may be close to a site of historic interest and request relevant information about the site. The non-customer portion of the interaction between the customer and a specific resource (e.g. restaurant, historic site, etc.) may be entirely automated, partially automated, and/or provided by a live agent allocated to interact with the customer for the period when they are querying the specific resource information. Thus, the customer interaction with the contact center could consist of a whole series of mini-interactions with various resources that may or may not involve a live agent, and each mini-interaction may result in a provision of useful information to the customer pertaining to that resource.

In one embodiment, one to all elements of a VR experience are recorded in a format for future use by the customer, such as for subsequent playback on a device available to the customer. The format may be based on known and/or determined capabilities of the user device and/or user preferences. The customer may then have access to the recorded elements so that they can avail of the useful information at a later stage, possibly when they visit the real-world location at a later time.

Furthermore, the recording may be optimized and/or tailored in one or more of a variety of formats such that it does not necessarily require a virtual reality experience in order for the customer to replay the recording. For example, the recording could consist of a series of Global Positioning System (GPS) coordinates corresponding to the customer's prior virtual journey as experienced in the VR contact center. An additional series of associated resource addresses (e.g., URIs, URLs, etc.) and/or media (e.g., audio and/or video clips), may be provided to render the key information previously requested by the customer during their VR experience, which may further comprise playing back a recorded segment of a live or automated agent interaction. Thus, the recording of the VR experience could easily be integrated with non-VR applications such as Google™ Maps, browser, audio/video player, and/or other more conventional applications, such as may be available on a smartphone or tablet device.

In another embodiment, when the customer eventually visits the actual real-world location, the previously provided useful information (recorded as part of a prior VR experience with the contact center) can now be rendered on another device, such as a mobile device carried by the customer, in a format the device is able to present. The playback, which may be determined by the capabilities of the device and/or user preferences, may be full virtual reality playback, such as the presentation of images based on location and/or device position. For example, a wearable device may utilize the device position as held or worn. Additionally, or alternatively, other VR sensory output device (e.g., tactile-playback gloves and/or other devices for touch, smell, audio, or taste). Playback may be an augmented reality (e.g., recorded/generated visual elements placed in a visual scene captured in real-time from a camera to cause a visual display of the mobile device to present an image comprising the recorded/generated visual elements appearing on the display as if they existed in the real-world and the captured scene). In another embodiment, the playback may be a non-VR such as audio, video, text, still images, or other element extracted or generated from the VR recording. Video playback may comprise presenting AVI, MOV, MP4, file formats; audio playback may comprise MP3, WAV, AIFF; text may comprise TXT or word processing formats (e.g., DOC, PDF, RTF, etc.); graphics may comprise JPEG, GIF; data formats may comprise HTML, XML, etc. It should be appreciated that the listing of formats is not exhaustive and other formats which may be presented, alone or in combination with other formats, by a mobile device may be implemented without departing from the scope of the embodiments provided herein.

The specific pieces of key or useful information can be triggered by the actual GPS location of the customer. For example, when the customer arrives at an historic site that they had previously virtually visited in the VR contact center, an audio recording segment of their prior conversation with the live "tour guide" VR agent is now automatically offered for replay. The customer can access a prior customized recording of a VR experience in a format that can then be utilized using more conventional applications when they eventually arrive at the actual location or anytime a location is selected. When visiting the physical location, a recording can be triggered by matching the GPS location of the user, and their associated device having playback capabilities, with the GPS location of an associated location of the recording performed during a prior virtual visit.

In another embodiment, the recording of the key information may be utilized in an augmented reality experience when the customer visits the real-world location, for example using technology such as Microsoft Hololens™ or equivalent. In this embodiment, the customer sees the actual real-world location, but this is augmented by the additional useful information such as audio clips, virtual screens of information, video clips etc., that were previously recorded as part of the VR experience.

In another embodiment, an interaction may comprise a series of VR mini-interaction recordings of the key information. The series may be manipulated by the customer so that the playback is filtered to the customer's preference. For example, the VR mini-interaction with a historic site might comprise of a pre-recorded audio segment, a short conversation with an agent, and/or a graphical display of key information. The customer may, for example, chose to mark the conversation as a "favorite" so that it is prioritized for playback first, even though that might not correspond to the original chronological order.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term means as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
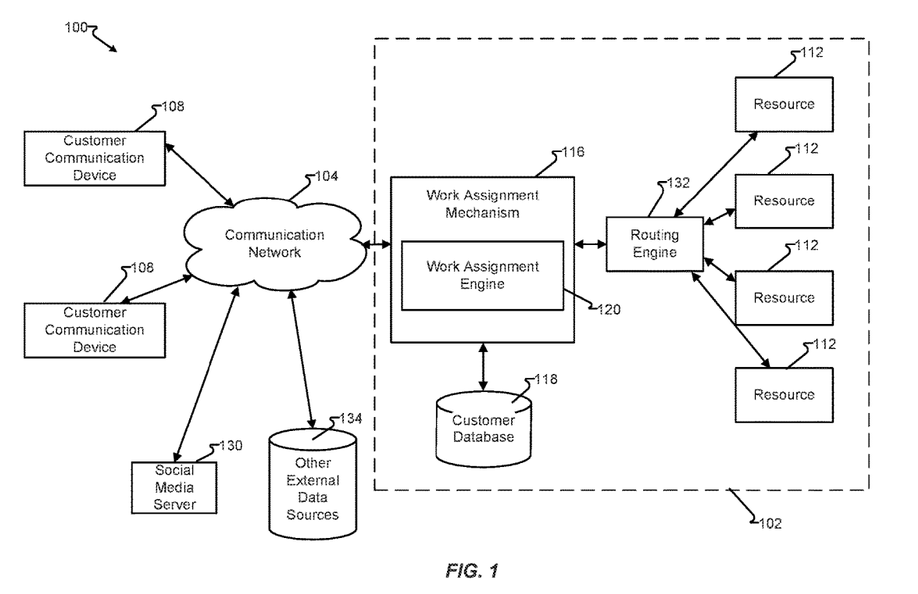
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources located on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
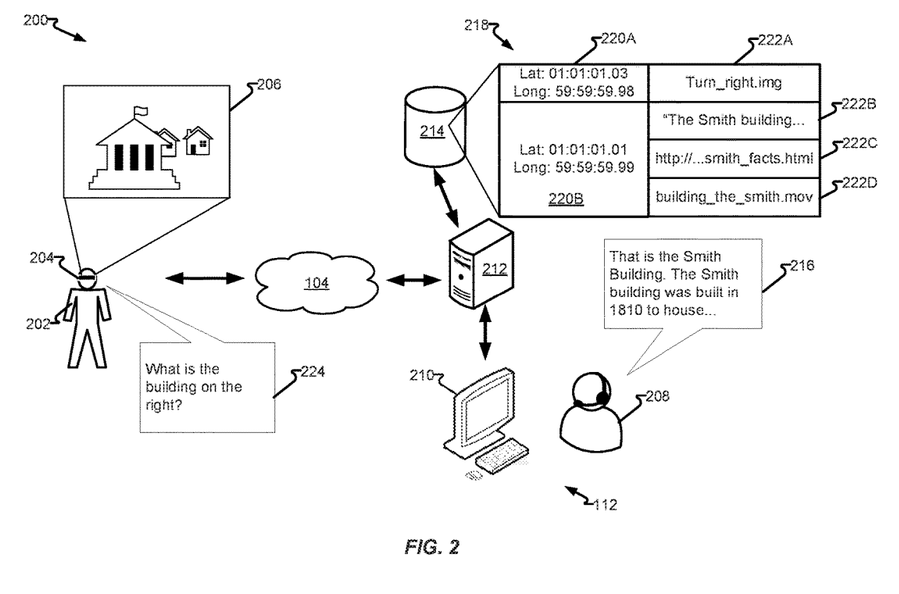
FIG. 2 depicts a second system in accordance with embodiments of the present disclosure.

FIG. 2 depicts system 200 in accordance with embodiments of the present disclosure. In one embodiment, customer 202 utilizes virtual reality device 204 to view virtual environment 206. Virtual reality device 204 may be in communication with server 212 via network 104. Virtual reality device 204 may comprise of one or more visual, audible, tactile, and/or olfactory output component or components. A tactile portion may comprise of one or more environmental aspects (e.g., temperature, humidity, wind, precipitation, etc.) and/or surface contact aspects (e.g., texture, weight, etc.). While virtual reality device 204 may comprise an output component embodied as a display component for any one or more aspects, for the sake of simplicity in illustrating certain embodiments described herein, visual aspects will be presented as a selective representation of any one or more aspects. Similarly, while location and location indicia is referenced as a two-dimensional position, three-dimensional positions may be utilized without departing from the scope of the embodiments provided herein.

In one embodiment, customer 202 is anticipating visiting a real-world location and as a precursor to the visit, visiting a virtual location of the real-world location. The virtual location may comprise of images, videos, audio files, text messages, links, and/or other virtual elements for playback at a subsequent time, such as when customer 202 is visiting the real-world location, and/or for presentation during the visitation of the virtual location.

In another embodiment, customer 202 may interact with resource 112 which may comprise of an automated resource and/or agent 208 utilizing agent communication device 210 to communicate with customer 202 such as via virtual reality device 204 and/or other device. Server 212 may facilitate the interaction between customer 202 and agent 208 and will provide other functionality such as maintaining access to database 214 storing records 218 comprising location indicia 220 and associated virtual-reality elements 222.

In one example, customer 202 is particularly interested in architectural features of a real-world location to be visited in the future. Virtual environment 206 may present still and/or video images representing the real-world location, as well as other aspects. A virtual location indicia may be associated with a corresponding real-world location indicia, such as a GPS or other coordinate. In one embodiment, the virtual environment location indicia is the same as a real-world environment location indicia. In another embodiment, a different location methodology, and associated indicia, may be utilized such as one where an origin is the center of the museum, or other area of interest. The virtual environment location indicia may be the same as the real-world environment location indicia or different, such as when a translation algorithm is provided converting one to the other.

Customer 202 may interact with agent 208 such as by asking question 224 or otherwise indicating a particular interest in a feature of virtual environment 206. Agent 208 and/or server 212 may provide response 216, which may be recorded for later playback, such as becoming virtual reality element 222B, or otherwise identifying the item of interest automatically and/or manually to provide a virtual-reality element 222 associated with the location 220. More specifically at location 220A, virtual-reality element 222A is associated. For example, if customer 202, as determined by a location aware device, is at an equivalent location in the real-world the location aware device, and/or an associated device, may present virtual-reality element 220A, such as an indicator to turn right. Additional virtual-reality elements may be provided such as a recorded interaction 222B between customer 204 and agent 208, link 222C selectable by customer 202 to be presented with alternative sources of information, multimedia components such as virtual-reality element 222D (e.g., a video or augmented reality component).

It should be appreciated that components provided in system 200 may be arranged differently and/or with more or fewer components. For example, database 214 may be embodied in a memory of a customer device as well as certain functionality of server 212, such as location detection in a real-world environment and/or virtual environment.

In another embodiment, server 212 may limit and/or modify virtual-reality elements 222 to those displayable by a customer device to be used by customer 202 while visiting the real-world location. For example, virtual-reality device 204 may present environmental aspects (e.g. temperature, precipitation, etc.). Customer 202 may utilize a smart phone to present virtual-reality elements 222 which does not have the capability to present such environmental aspects. Accordingly, server 202 may omit virtual-reality elements 222 that comprise environmental aspects, modify virtual reality elements 222 to be presentable (e.g., text and/or visual representation of temperature, precipitation, etc.). In another embodiment, server 212 may record virtual-reality elements 222 which may include those incapable of being presented by a customer device. Upon request for a virtual-reality element 222 which is not capable of being presented by the customer device, server 212 may convert and/or omit such a virtual-reality element. In a further embodiment, customer 202 may selectively present which elements should and/or should not be presented during the recording/selecting of virtual reality elements 222, retrieval by server 212, and/or presentation by a customer device.

It should be appreciated that database 214 may be a magnetic, optical, or electronic data storage device or devices and/or a data source operable to retrieve and/or generate at least one virtual element 222. For example, one virtual element 222 may be a link that accesses current information for presentation as a virtual element. In another embodiment, one virtual reality element 222 may be edited, for example, recorded interaction 222B may comprise an error and a party, such as agent 208, may edit the virtual reality element accordingly. For example, agent 208 may have stated an incorrect closing time for a museum and can therefore edit the audio file, (e.g., virtual reality element 222B) to apply the correction.

Figure 3:
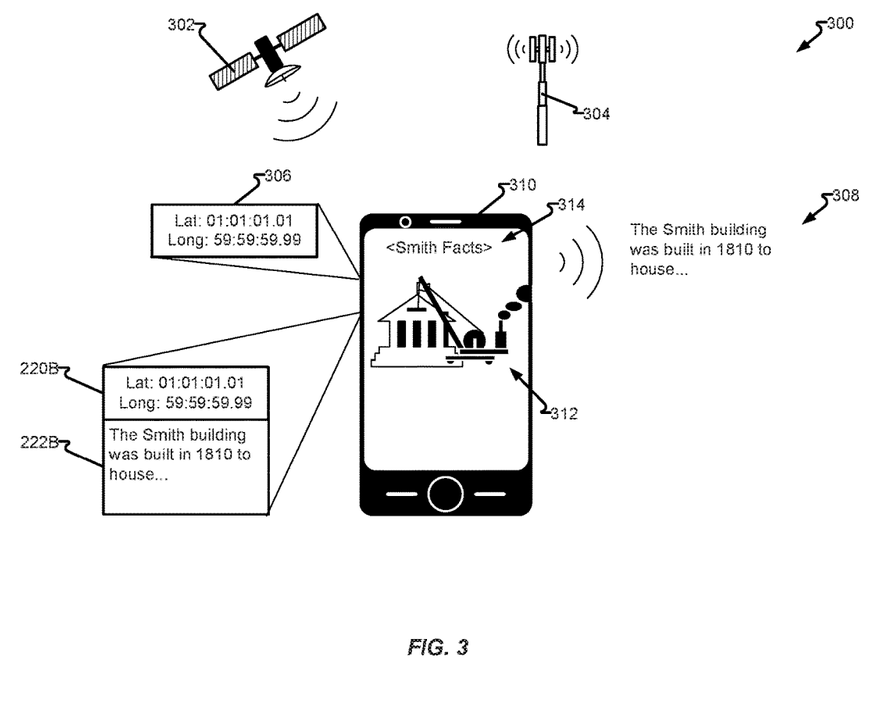
FIG. 3 depicts a third system in accordance with embodiments of the present disclosure.

FIG. 3 depicts system 300 in accordance with embodiments of the present disclosure. In one embodiment, customer device 310 is in the possession of or closely associated with customer 202 while at the real-world location which was previously modeled in virtual environment 206 (see FIG. 2). Customer device 310 may determine its real-world location such as by receiving signals from satellite 302 and/or cellular transmitter 304 or other location indicating input. Customer device 310 may then determine a current location indicia 306 and determine whether a match exists with a stored location indicia, such as stored location indicia 220B. If such a match does exist, virtual-reality element 222B may be selected for presentation by customer device 310.

Customer device 310 may provide audio output 308, such as upon determining current location indicia 306 matches stored location indicia 220B associated with audio presentation 222B. Other virtual-reality elements may include link 314, selectable by a user to present additional information and/or websites comprising information and/or augmented reality 312. Augmented reality 312 may present audio and/or visual elements in combination with the captured image, such as by a live camera image received by customer device 310, integrated therewith for presentation by customer device 310. For example, customer device 310 may display an image of the building currently being captured by a camera associated with customer device 310 integrated with a historical content, such as a stored video image of a subject building being constructed. Gyroscopic and/or other positional elements allow for the augmented reality elements to maintain position relative to the captured camera image to provide an illusion of the combination of both augmented reality elements and live footage.

Figure 4:
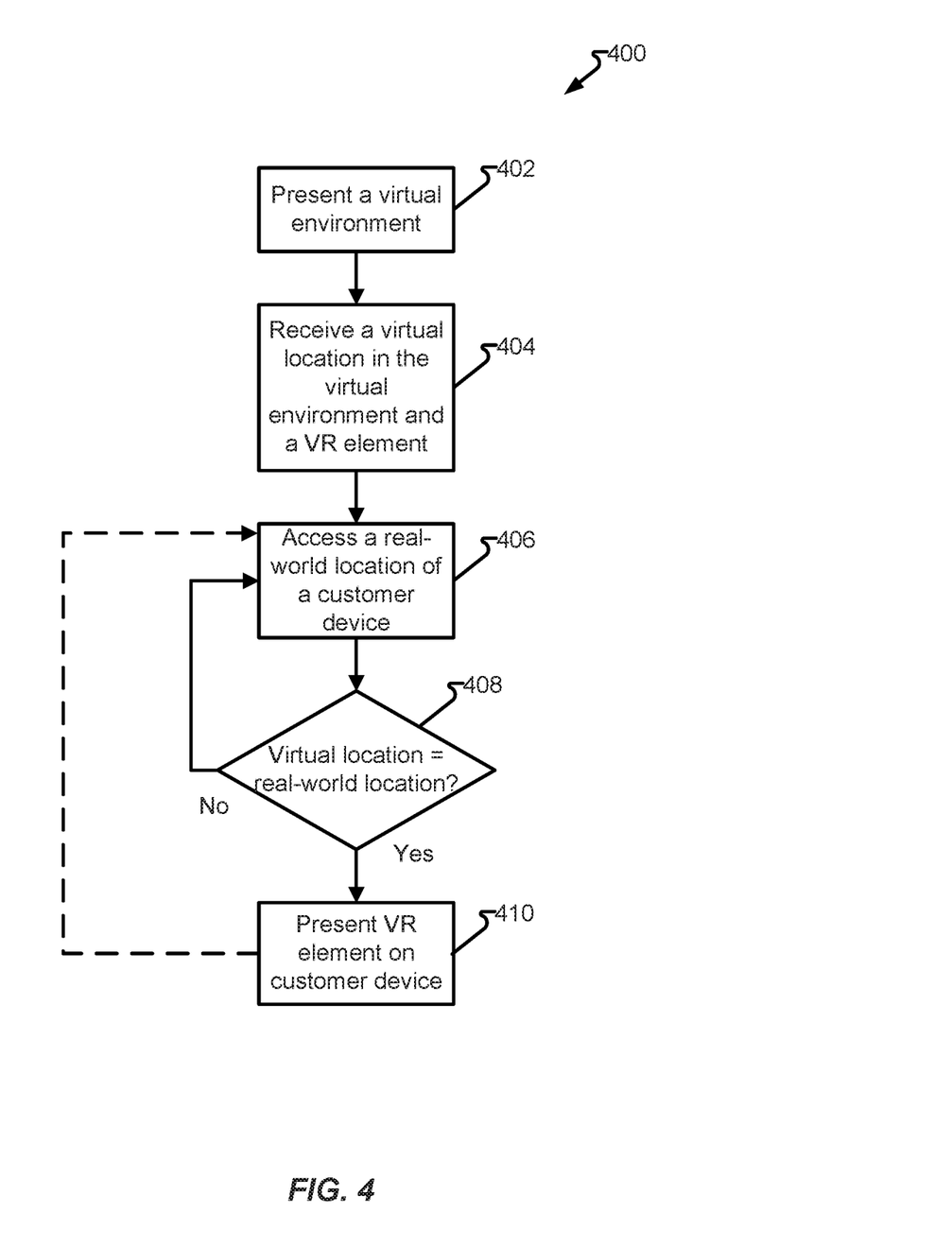
FIG. 4 depicts a process in accordance with embodiments of the present disclosure.

FIG. 4 depicts process 400 in accordance with embodiments of the present disclosure. In one embodiment, process 400 begins at step 402 where a customer, such as customer 202, is presented with a virtual environment, such virtual environment 206 presented by virtual reality display device 204. Next, step 404 receives a location in the virtual world and an associated virtual-reality element. Next, step 406 accesses a real-world location of customer device 310 operable to display the virtual-reality element. Determination 408 then determines whether the virtual location indicia is associated with the real-world location indicia and, if determination 408 is determined in the affirmative, process 400 proceeds to step 410. If determination 408 is determined in the negative, process 400 may end or continue back to step 406, such as to again access the real-world location indicia and execute determination step 408 for the same or a different virtual location indicia.

Step 410 presents the virtual-reality element on customer device 310 which may be the same or different from the device utilized to present the virtual environment in step 402. Additionally, step 410 may present a modified format, such as having a resolution and/or aspect operable to be displayed by the particular customer device.

In one embodiment, determination 408 determines if there is an exact match between a virtual location indicia and the real-world location indicia at least with the precision available to customer device 310. In another embodiment, the virtual location indicia is determined to be equivalent to the real-world indicia if the difference is within an acceptable range. The range may be determined by type of virtual-reality element and/or subject of the virtual-reality element. For example, virtual reality element for a painting in a museum may not be displayed until the acceptable range is reached, which may be within a few steps of the real-world location indicia, such as close enough for the customer to see and/or see with sufficient detail, the painting. A virtual reality element may then be presented on customer device 310, such as to provide supplementary information on the painting. The museum itself may be associated with the same or similar real-world location indicia but the virtual reality element of the museum may not be presented when customer device 310 is further away, such as to present virtual reality elements to assist the customer in locating the museum or providing information on architectural features of the museum building. As a benefit, customer 202 may be able to "zoom" and see more/fewer virtual reality elements 222 based on a user selection and/or range.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (e.g., GPU, CPU), or logic circuits programmed with the instructions to perform the methods (e.g., FPGA). In another embodiment, a processor may be a system or collection of processing components, such as a processor on a client device and a processor on a server, a collection of devices with them on a respective processor, or a shared or remote processing service (e.g., "cloud" based processor). A system of processors may comprise task-specific allocation of processing tasks and/or shared or distributed processing tasks.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., processors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a processor may comprise a first processor on one component and a second processor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. An electronic device, comprising:
   a position signal receiver;
   an output component;
   a processor; and
   a data source; and
   wherein the processor:
   accesses a current location indicia of the user device from the position signal receiver;
   accesses a stored location indicia associated with a virtual reality element maintained in the data source and wherein the virtual reality element comprises at least a portion of a stored virtual reality recording;
   determines whether the current location indicia matches, within a previously determined range, the stored location indicia; and
   causes the output component to present the virtual reality recording in response to the determination that the current location indicia does match, within the previously determined range, the stored location indicia; and
   wherein presenting the virtual reality recording comprises presenting the signal virtual reality element for interaction from an input, the input comprising the position receiver and wherein the processor then presents the virtual reality element in accordance with the relative position of the current location to the stored location indicia.

2. The electronic device of claim 1, further comprising:
   a network interface connecting the electronic device to a network; and
   wherein the data source is located externally to the electronic device and the processor accesses the data source via the network interface.

3. The electronic device of claim 1, wherein the virtual reality recording, comprises the virtual reality element, was captured during a virtual visit to a site and wherein stored virtual reality recording is created during the virtual visit to the site.

4. The electronic device of claim 3, wherein the virtual reality element comprises a stored interaction between a user and an agent of a contact center recorded during the virtual reality presentation of the stored location.

5. The electronic device of claim 1, wherein the electronic device previously recorded the virtual reality recording.

6. The electronic device of claim 1, wherein the site comprises a real-world location and the virtual visit to the site comprises a virtual visit to a model of the real-world location maintained and presented by a computer and wherein the model of the real-world location has a location indicia equivalent to a real-world location indicia of the real-world location and wherein the stored location indicia is selected from the location indicia.

7. The electronic device of claim 1, wherein the virtual reality element comprises one or more of a website address, content of a website, video file, image, audio file, symbol, or textual content.

8. The electronic device of claim 7, further comprising:
   an input component; and
   wherein the processor causes virtual reality element to selectively comprises the one or more of the website address, content of the website, video file, image, audio file, symbol, or textual content as determined in accord with a user input to the input component.

9. The electronic device of claim 1, further comprising:
   a camera; and
   wherein the processor causes the output component to present the virtual reality element as an augmented reality portion in conjunction with at least a portion of an image captured by the camera wherein the virtual reality element is visually presented in front of at least one portion of the image captured by the camera.

10. A method, comprising:
    accessing a current location indicia of a user device from a position signal receiver associated with the user device;
    accessing a stored location indicia associated with a virtual reality element maintained in a data source and wherein the virtual reality element comprises at least a portion of a stored virtual reality recording;
    determining whether the current location indicia matches, within a previously determined range, the stored location indicia; and
    causing an output component of the user device to present the virtual reality recording in response to the determination that the current location indicia does match, within the previously determined range, the stored location indicia; and
    wherein presenting the virtual reality recording comprises presenting the virtual reality element for interaction from an input, the input comprising the position signal receiver and wherein the processor then presents the virtual reality element in accordance with the relative position of the current location to the stored location indicia.

11. The method of claim 10, wherein the virtual reality recording, comprises the virtual reality element, is captured during a virtual visit to a site and wherein a virtual position of a recording device during the recording of the virtual visit to the site determines the stored location indicia.

12. The method of claim 11, wherein the virtual reality element comprises a stored interaction between a user and an agent of a contact center recorded during the virtual reality presentation of the stored location.

13. The method of claim 10, wherein the site comprises a real-world location and the virtual visit to the site comprises a virtual visit to a model of the real-world location maintained and presented by a computer and wherein the model of the real-world location has a location indicia equivalent to a real-world location indicia of the real-world location and wherein the stored location indicia is selected from the location indicia.

14. The method of claim 10, wherein the virtual reality element comprises one or more of a website address, content of a website, video file, image, audio file, symbol, or textual content.

15. A system, comprising:
a network interface;
a server; and
an agent communication device associated with an agent of a contact center; and
wherein the server:
facilitates an interaction comprising the network interface wherein the interaction comprises a communication between the agent, utilizing the agent communication device, and a customer, utilizing a customer communication device;
presents a virtual reality visit to the customer device, wherein the virtual reality visit comprises a virtual reality element;
causes the virtual reality recording to be recorded to a data storage and associated with a stored location indicia associated with a real-world location of a virtual-world location of the virtual reality element; and
upon receiving a signal from a user device indicating a location of the user device equivalent to the stored location indicia, causing the user device to present the virtual reality recording to be retrieved from the data storage and presenting for interaction from an input whereby the processor then presents the virtual reality element in accordance with the relative position of the current location to the stored location indicia.

16. The system of claim 15, further comprising, the server processing the virtual reality element from a first format to a second format, wherein the user device is able to present the virtual reality element in the second format and not able to present the virtual reality element in the first format.

17. The system of claim 15, wherein the virtual reality element comprises a factoid of an item discussed during the interaction.

18. The system of claim 15, wherein the location of the user device is equivalent to the stored location indicia upon the difference being within a previously determined difference in accord with the virtual reality element.

19. The system of claim 15, wherein the virtual reality element comprises one or more of a website address, content of a website, video file, image, audio file, symbol, or textual content.

20. The system of claim 19, further comprising:
an input component; and
wherein the processor causes virtual reality element to selectively comprises the one or more of the website address, content of the website, video file, image, audio file, symbol, or textual content as determined in accord with a user input to the input component.

* * * * *

UNITED STATES PATENT AND TRADEMARK OFFICE
CERTIFICATE OF CORRECTION

PATENT NO.        : 10,484,643 B2
APPLICATION NO.   : 15/348054
DATED             : November 19, 2019
INVENTOR(S)       : Thomas Moran It is certified that error appears in the above-identified patent and that said Letters Patent is hereby corrected as shown below:

In the Claims

At Column 15, Line 66, please delete "signal" therein.

At Column 16, Line 1, after "position" insert --signal-- therein.

Signed and Sealed this
Eleventh Day of February, 2020

Andrei Iancu
*Director of the United States Patent and Trademark Office*